(12) United States Patent
Hashioka et al.

(10) Patent No.: US 10,865,073 B2
(45) Date of Patent: Dec. 15, 2020

(54) PASSENGER CONVEYOR

(71) Applicant: Mitsubishi Electric Corporation, Tokyo (JP)

(72) Inventors: Yutaka Hashioka, Tokyo (JP); Ayaka Ushirosako, Tokyo (JP); Masahiko Nawata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/763,236

(22) PCT Filed: Nov. 22, 2017

(86) PCT No.: PCT/JP2017/041982
§ 371 (c)(1),
(2) Date: May 12, 2020

(87) PCT Pub. No.: WO2019/102542
PCT Pub. Date: May 31, 2019

(65) Prior Publication Data
US 2020/0307960 A1 Oct. 1, 2020

(51) Int. Cl.
*B66B 23/00* (2006.01)
*B66B 29/00* (2006.01)
*B65G 21/00* (2006.01)

(52) U.S. Cl.
CPC .............. *B66B 23/00* (2013.01); *B65G 21/00* (2013.01); *B66B 29/00* (2013.01); *B65G 2207/20* (2013.01)

(58) Field of Classification Search
CPC ......... B66B 23/00; B66B 29/00; B65G 21/00; B65G 2207/20
See application file for complete search history.

(56) References Cited

U.S. PATENT DOCUMENTS 6,637,580 B1 * 10/2003 Sneed .................... B65G 21/00
                                                           198/326
9,254,986 B2 * 2/2016 Inoue ...................... B66B 21/02
(Continued)

FOREIGN PATENT DOCUMENTS

| JP | 2012-066937 A | 4/2012 |
| JP | 5985685 B1 * | 9/2016 |
| JP | 2016-183008 A | 10/2016 |

OTHER PUBLICATIONS

International Search Report and Written Opinion dated Jan. 9, 2018 for PCT/JP2017/041982 filed on Nov. 22, 2017, 9 pages including English Translation of the International Search Report.

*Primary Examiner* — Mark A Deuble
(74) *Attorney, Agent, or Firm* — Xsensus LLP

(57) ABSTRACT

A passenger conveyor includes a main frame, a support angle at an end in a longitudinal direction of the main frame and which is to be disposed on a building structure; and a support reinforcement part. The support reinforcement part includes a connection portion which is fixed to the support angle, a building-side extension portion which is extended from the connection portion along a floor face of the building structure, and a main-frame-side extension portion which is extended from the connection portion along an upper face of the main frame. In a case where the building-side extension portion of the support reinforcement part is in contact with the building structure, and the support angle is not in contact with the building structure, at least one portion of the main-frame-side extension portion is able to touch the upper face of the main frame.

12 Claims, 14 Drawing Sheets

(56) References Cited

U.S. PATENT DOCUMENTS

| | | | | |
|---|---|---|---|---|
| 9,834,416 B2* | 12/2017 | Krampl | ............... | B66B 21/02 |
| 10,364,129 B2* | 7/2019 | Landsbeck | ............ | B66B 21/04 |
| 10,421,643 B2* | 9/2019 | Mori | .................. | B66B 23/00 |
| 2003/0102198 A1* | 6/2003 | Nusime | ............... | B66B 21/00 |
| | | | | 198/321 |
| 2018/0231095 A1* | 8/2018 | Landsbeck | ............ | F16F 15/03 |
| 2019/0322492 A1* | 10/2019 | Eder | .................. | B66B 23/14 |

* cited by examiner

PASSENGER CONVEYOR

CROSS-REFERENCE TO RELATED APPLICATION

The present application is based on PCT filing PCT/JP2017/041982, filed Nov. 22, 2017, the entire contents of which are incorporated herein by reference.

TECHNICAL FIELD

The present invention relates to a passenger conveyor.

BACKGROUND ART

The main body of a conventional passenger conveyor is supported by disposing, at both ends in the longitudinal direction, its support angles on the building structure. The length of a disposition margin in the support angle for disposing on the building structure is stipulated so that, even when the building shakes due to an earthquake, the support angle will never get off from the building structure and never cause the passenger conveyor to fall. Here, the building standard law of Japan defines a building shake amplitude expected to be caused by earthquakes.

This law was revised in 2014 (in the building standard law enforcement order, Article 129-12 Paragraph 1, Item 6, and the ministry notification No. 1046 in 2013 from the ministry of land, infrastructure, transport and tourism), and the building shake amplitude due to an earthquake, which is to be taken into account in installation of a passenger conveyor, was dramatically changed. To comply with the revision, it is necessary to make longer the disposition margin length of the support angle to be disposed on the building structure. For the revision, Patent Document 1 discloses a passenger conveyor including a support angle which is attached to an end portion of the truss frame and which is to be disposed on the building structure, the passenger conveyor being provided with an additional frame whose one end is attached to a main chord part of the truss frame and the other end of which is disposed on the finished floor of the building structure, so that the support angle has a longer length for being disposed on the building structure.

Note here that, in a case where an earthquake occurs to cause a building shake with its amplitude stipulated in the post-revision law and the additional frame receives a support reaction force (a force that the support angle receives from the upper/lower floor portions of the building, on which the main body of the passenger conveyor is disposed) from the building structure at a position beyond the end of the conventional support angle, the moment acting around the base corner of the support angle becomes lager than a moment in a case where there is no additional frame. In the passenger conveyor according to Patent Document 1, when the additional frame receives a support reaction force from the building structure, the additional frame extended to the main chord part side receives a force in a perpendicular direction from the main chord part. This results in a reduction of the moment acting around the base corner of the support angle.

PRIOR ART DOCUMENTS

Patent Documents

Patent Document 1: Unexamined Patent Application Publication JP, 2016-183008, A

SUMMARY OF THE INVENTION

Problems to be Solved by the Invention

The main body structure strength of a passenger conveyor is designed in consideration of forces acting on individual parts in the normal operation. In the passenger conveyor according to Patent Document 1, an additional frame is fixed to the main chord part. In a case where an earthquake occurs, the main chord part of the passenger conveyor according to Patent Document 1 receives not only a vertical force necessary for reducing moment, but also a force in a direction perpendicular to the vertical force. In designing the strength of the main body structure of a passenger conveyor, a situation is also taken into consideration in which an earthquake occurs to cause a building shake amplitude stipulated in the pre-revision law. However, in the designing the strength thereof, a situation is not taken into consideration in which an earthquake occurs to cause a building shake with its amplitude stipulated in the post-revision law and the additional frame receives a support reaction force from the building structure at a position beyond the end of the conventional support angle. As the result, the additional frame of the passenger conveyor according to Patent Document 1 and the main chord part to which the additional frame is fixed may crack or deform due to repeated fatigue.

The present invention is devised to solve the problem described above, and is aimed at providing passenger conveyor in which the moment acting around the base corner of the support angle is reduced and the main frame is prevented from cracking and deforming.

Solution to Problems

A passenger conveyor according to the present invention includes: a main frame; a support angle which is provided at an end in a longitudinal direction of the main frame and which is to be disposed on a building structure; a support reinforcement part comprising a connection portion which is fixed to the support angle, a building-side extension portion which is extended from the connection portion along a floor face of the building structure, and a main-frame-side extension portion which is extended from the connection portion along an upper face of the main frame, wherein the main-frame-side extension portion is not fixed to the upper face of the main frame, and wherein in a case where the building-side extension portion of the support reinforcement part is in contact with the building structure, and the support angle is not in contact with the building structure, at least one portion of the main-frame-side extension portion is able to touch the upper face of the main frame.

Advantages of the Invention

A passenger conveyor according to the present invention includes: a support reinforcement part comprising a connection portion which is fixed to the support angle, a building-side extension portion which is extended from the connection portion along a floor face of the building structure, and a main-frame-side extension portion which is extended from the connection portion along an upper face of the main frame, wherein the main-frame-side extension portion is not fixed to the upper face of the main frame, and wherein in a case where the building-side extension portion of the support reinforcement part is in contact with the building structure, and the support angle is not in contact with the building structure, at least one portion of the main-frameside extension portion is able to touch the upper face of the main frame. Therefore, it is possible to provide a passenger conveyor in which the moment acting around the base corner of the support angle is reduced to prevent the main frame from cracking and deforming.

EMBODIMENTS

Embodiment 1

Figure 1:
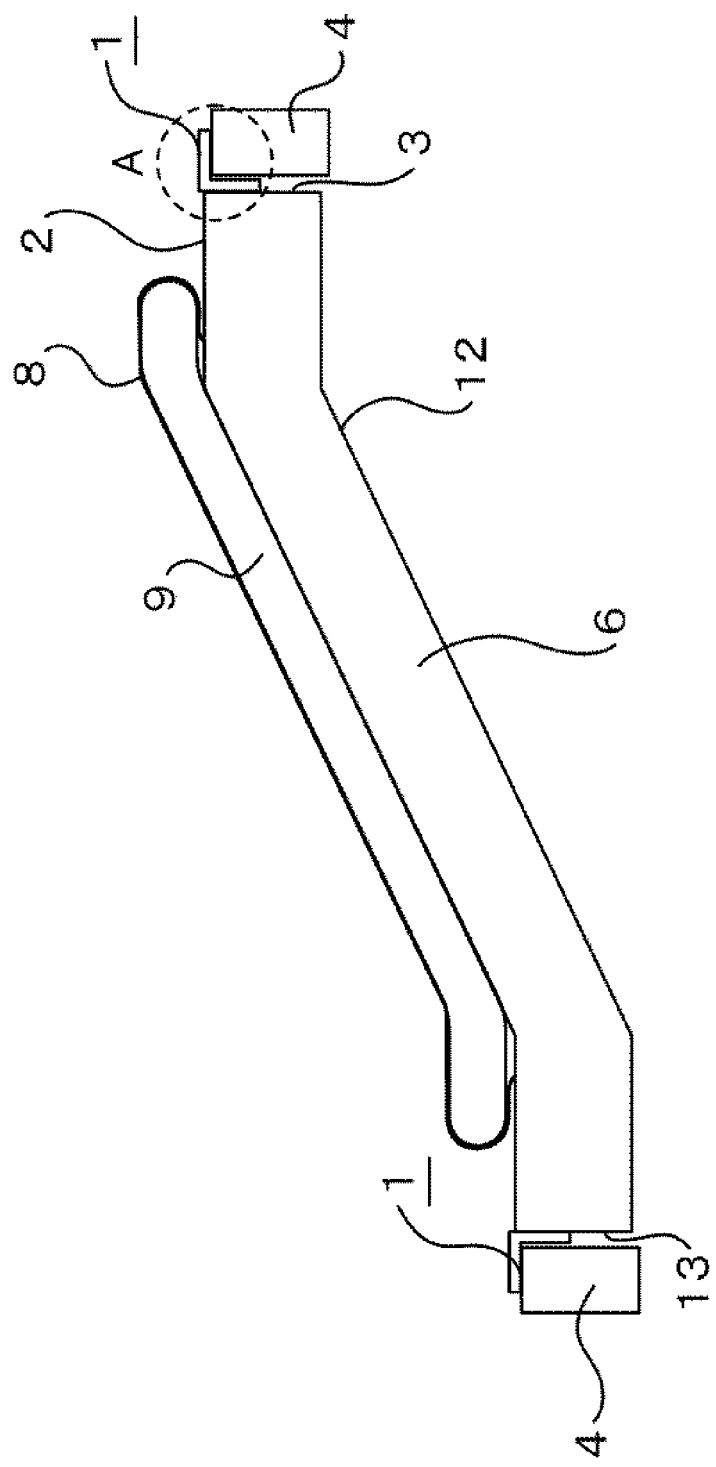
FIG. 1 is an overall view of a conventional passenger conveyor installed in a building structure.

Hereinafter, the configuration and operation of a passenger conveyor according to the present embodiment will be described with reference to FIG. 1 to FIG. 10. FIG. 1 is a cross-sectional view of a conventional passenger conveyor installed in a building structure 4. In FIG. 1, a main frame 6 of the passenger conveyor is disposed between an upper floor of the building structure 4 and a lower floor thereof by means of support angles 1 each consisting of a steel angle. On the main frame 6, a balustrade 9 is provided. Around the balustrade 9, the moving handrail 8 is provided. The main frame 6 supports a plurality of steps (not illustrated) connected endlessly. Each of the tread-boards and the moving handrail 8 are driven by the driving force of a drive machine (not illustrated) installed in the main frame 6 to move and circulate between the upper floor and the lower floor of the building structure 4.

Also, the main frame 6 includes: an upper chord part 2 arranged along the longitudinal direction of the main frame 6; a lower chord part 12 arranged under and along the upper chord part 2; an upright part 3 fixed to and between the upper end of the upper chord part 2 and that of the lower chord part 12; and an upright part 13 fixed to and between the lower end of the upper chord part 2 and that of the lower chord part 12.

Figure 2:
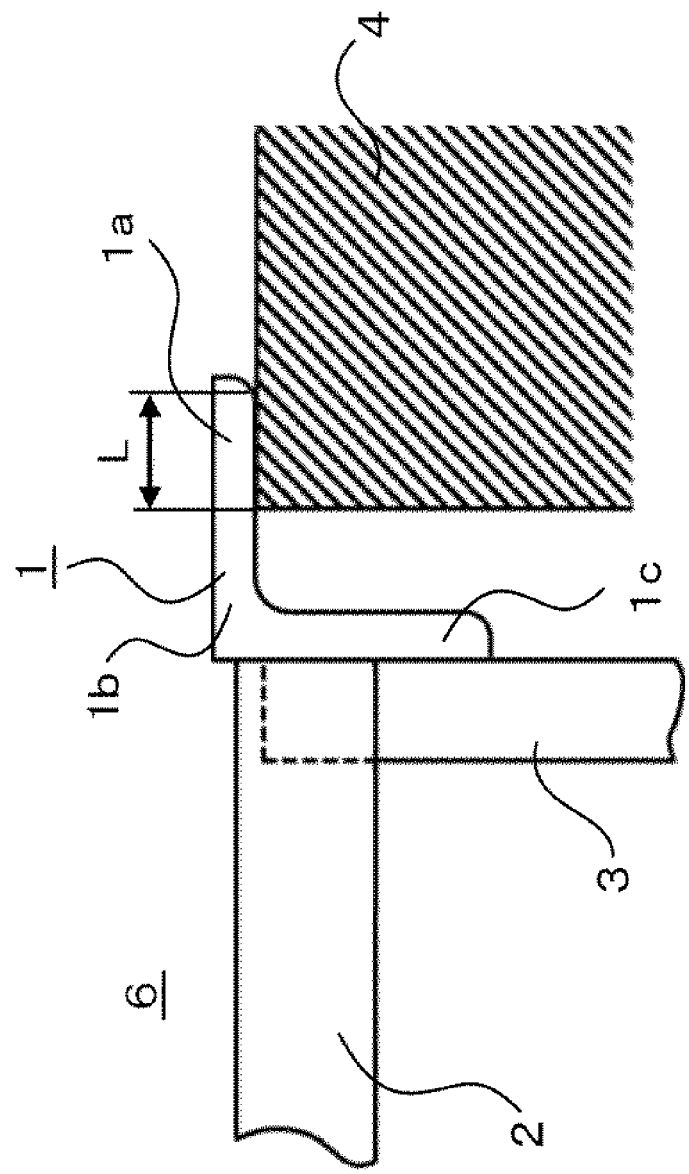
FIG. 2 is a cross-sectional view of a support angle of the conventional passenger conveyor.

FIG. 2 is a cross-sectional view of the support angle 1 of the conventional passenger conveyor and its vicinity (area A in the FIG. 1). The support angle 1 is a steel part (steel angle) that is bent at its base corner 1b to form an L-shape. A mounting portion 1c of the support angle 1 is fixed to the upper chord part 2 and the upright part 3 by welding or bolting. The support angle 1 is disposed on the floor face of the building structure 4. However, the support angle 1 is not fixed to the building structure 4. An end 1a of the support angle 1 is the end of a portion of the support angle 1, the portion thereof being disposed on the floor face of the building structure 4.

A length L in FIG. 2, which is the length of the part where the support angle 1 touches the building structure 4, is called a displacement margin length. When a new passenger conveyor is installed, the displacement margin length L is set so that the passenger conveyor will never fall even when an earthquake occurs to produce an expected building shake stipulated in the building standard law.

Figure 3:
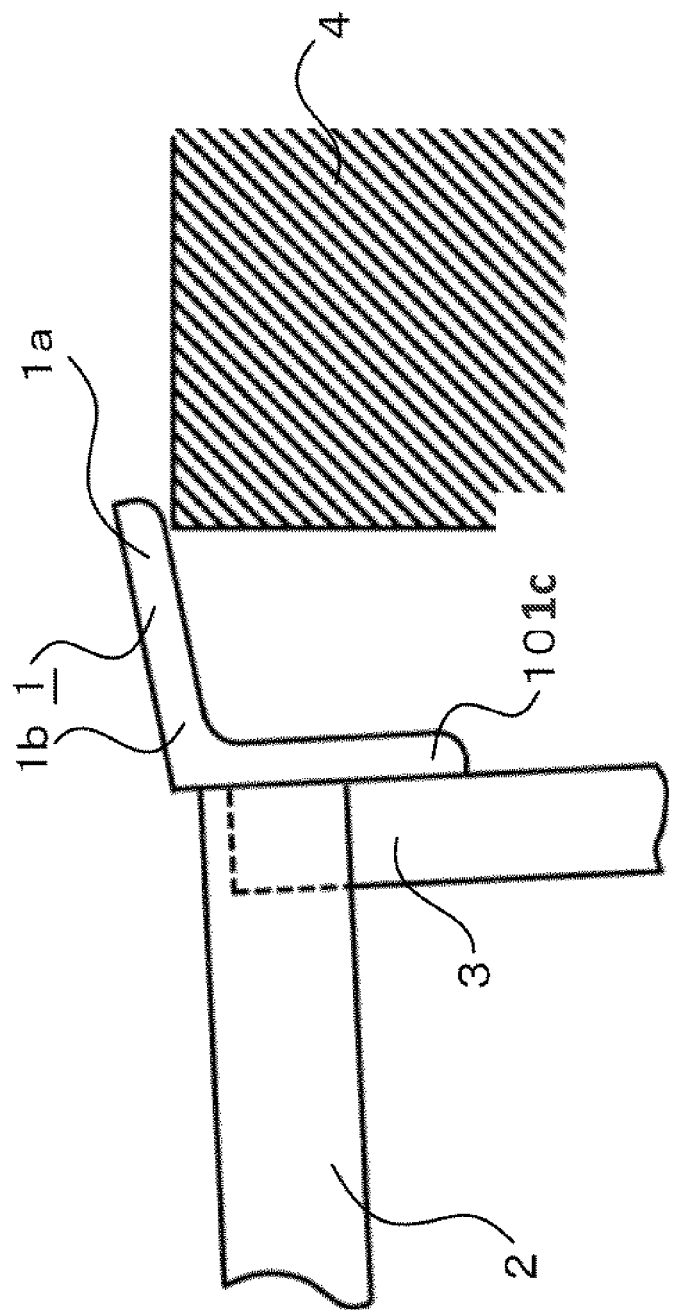
FIG. 3 is a cross-sectional view which is for describing Embodiment 1 and which shows how a supporting part is deformed when a support reaction force acts on a support angle of the conventional passenger conveyor.

FIG. 3 shows how the support angle 1 of the conventional passenger conveyor deforms when it receives a support reaction force from the building structure 4. The main frame 6 bends perpendicularly downward due to the self-weight of the passenger conveyor; in the support angle 1, a warp occurs in a portion between the part mounted to the upper chord part 2 and the upright part 3 and an end 1a of the support angle 1 receiving the support reaction force. In this state, especially in the support angle 1, a deformation occurs in a portion starting from the mounting portion of the upper chord part 2 and the upright part 3 and ending at the end 1a receiving the support reaction force; the moment produced by the support reaction force takes its maximum value at around a mounting portion 1c which is a portion attached to the upright part 3 and is a portion most distant from the end 1a. In the conventional passenger conveyor, the support angle 1 is originally designed so as to have a strength and rigidity enough to prevent the support angle 1 from deforming or breaking when receiving the support reaction force at the end 1a of the support angle 1.

As previously described, the building standard law was revised in 2014, and stipulated that a building shake amplitude larger than before should be taken into consideration when an earthquake occurs. Consequently, it becomes necessary for a newly installed passenger conveyor that a support angle 1 is designed so as to have a displacement margin length L longer than before. On the other hand, it becomes necessary for the passenger conveyor already installed in the building structure that, in order to comply with the revised building standard law, the displacement margin length L with which the support angle 1 is disposed on the building structure 4 is extended.

Figure 4:
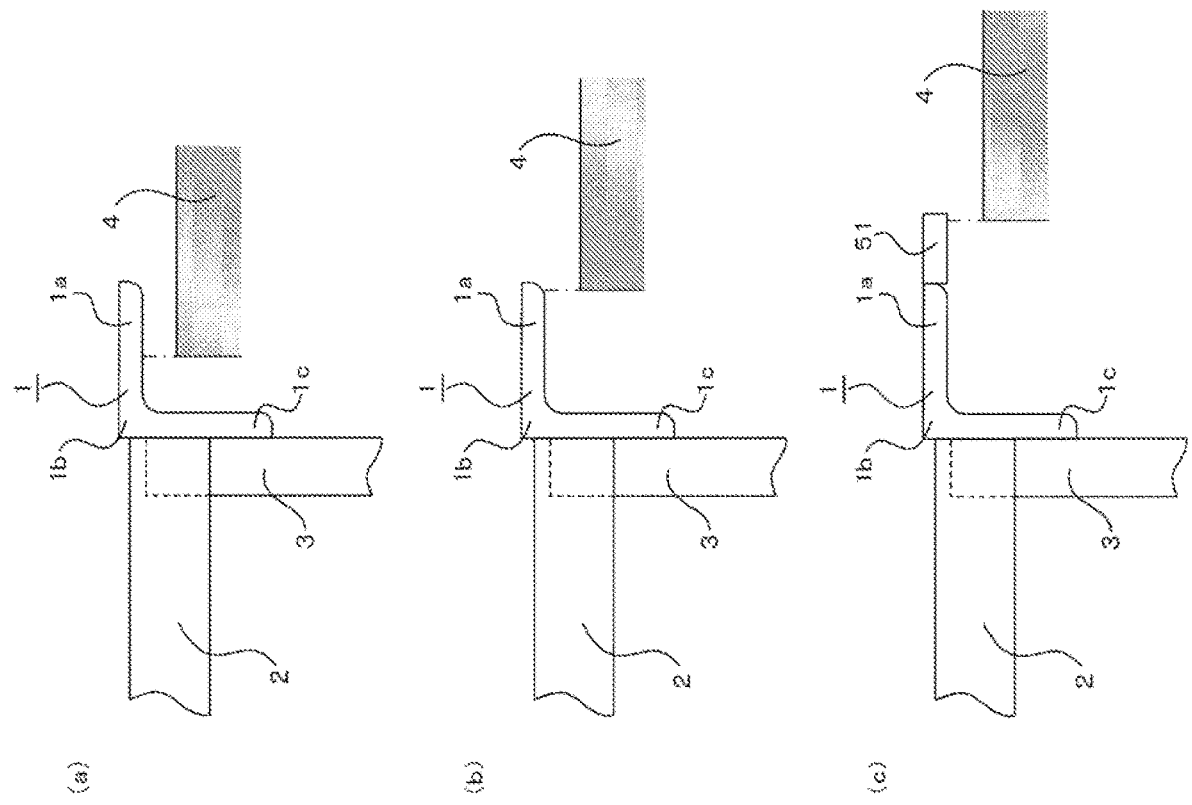
FIG. 4 are cross-sectional views which are for describing Embodiment 1 and which show how the acting point of the support reaction force in the conventional passenger conveyor varies in relation to the revision of earthquake-proof standards.

FIG. 4 show the differences in the displacement margin length of the support angle 1 and the building structure 4 before and after the revision of the building standard law. FIG. 4(a) shows the position of the building structure 4 with the support angle 1 being disposed thereon. FIG. 4(b) shows the position of the building structure 4 which is moved by the shake amplitude of the earthquake expected in the pre-revision building standard law. FIG. 4(c) shows the position of the building structure 4 which is moved by the shake amplitude of the earthquake expected in the post-revision building standard law.

The position of the building structure 4 to be moved by the shake amplitude due to an earthquake expected in the post-revision building standard law is distant from the position of the end 1a of the conventional support angle 1. Consequently, in order to support the passenger conveyor, it becomes necessary to provide an extension part 51 which extends the end 1a of the support angle 1. However, in a case where the extension part 51, which is positioned more distant from the base corner 1b of the support angle 1 compared to the end 1a of the support angle 1, receives the support reaction force from the building structure 4, a larger moment acts around the base corner 1b of the support angle 1 in comparison to a case where the end 1a of the support angle 1 receives the support reaction force. In that case, a crack may be produced at a point where the stress exceeds the material breaking load of the main frame 6, whereby the passenger conveyor may fall down.

Figure 5:
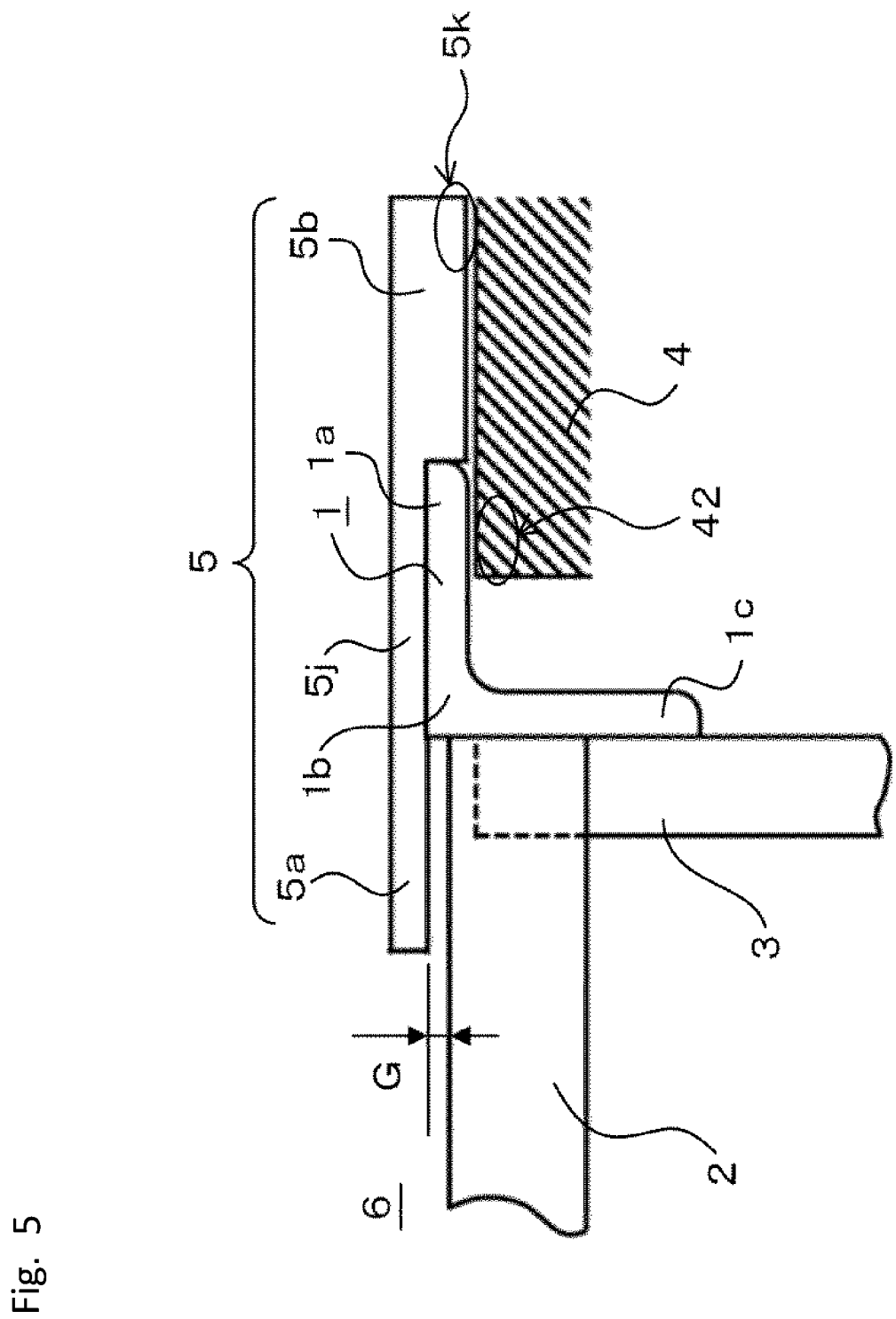
FIG. 5 is a cross-sectional view of a support reinforcement part attached to the support angle of the passenger conveyor according to Embodiment 1 of the present invention.

FIG. 5 is a cross-sectional view of a support reinforcement part 5 attached to the support angle 1 of the passenger conveyor according to the present embodiment. The support reinforcement part 5 includes a main-frame-side extension portion 5a, a building-side extension portion 5b and a connection portion 5j. The connection portion 5j positions between the main-frame-side extension portion 5a and the building-side extension portion 5b, and is fixed to the upper side of the support angle 1 by welding, bolting, or the like. The main-frame-side extension portion 5a extends from the base corner 1b of the support angle 1 and extends along the upper face of the upper chord part 2 of the main frame 6. A gap G is provided between the lower face of the main-frame-side extension portion 5a and the upper face of the upper chord part 2. The building-side extension portion 5b extends along the floor face of the building structure 4. A lower face end 5k of the building-side extension portion 5b is located at a position on the lower face of the building-side extension portion 5b, which is most distant from the passenger conveyor installed to the building structure 4. A floor face end 42 of the building structure 4 is located at a position on the floor face of the building structure 4, which is the closest to the passenger conveyor installed to the building structure 4.

Figure 6:
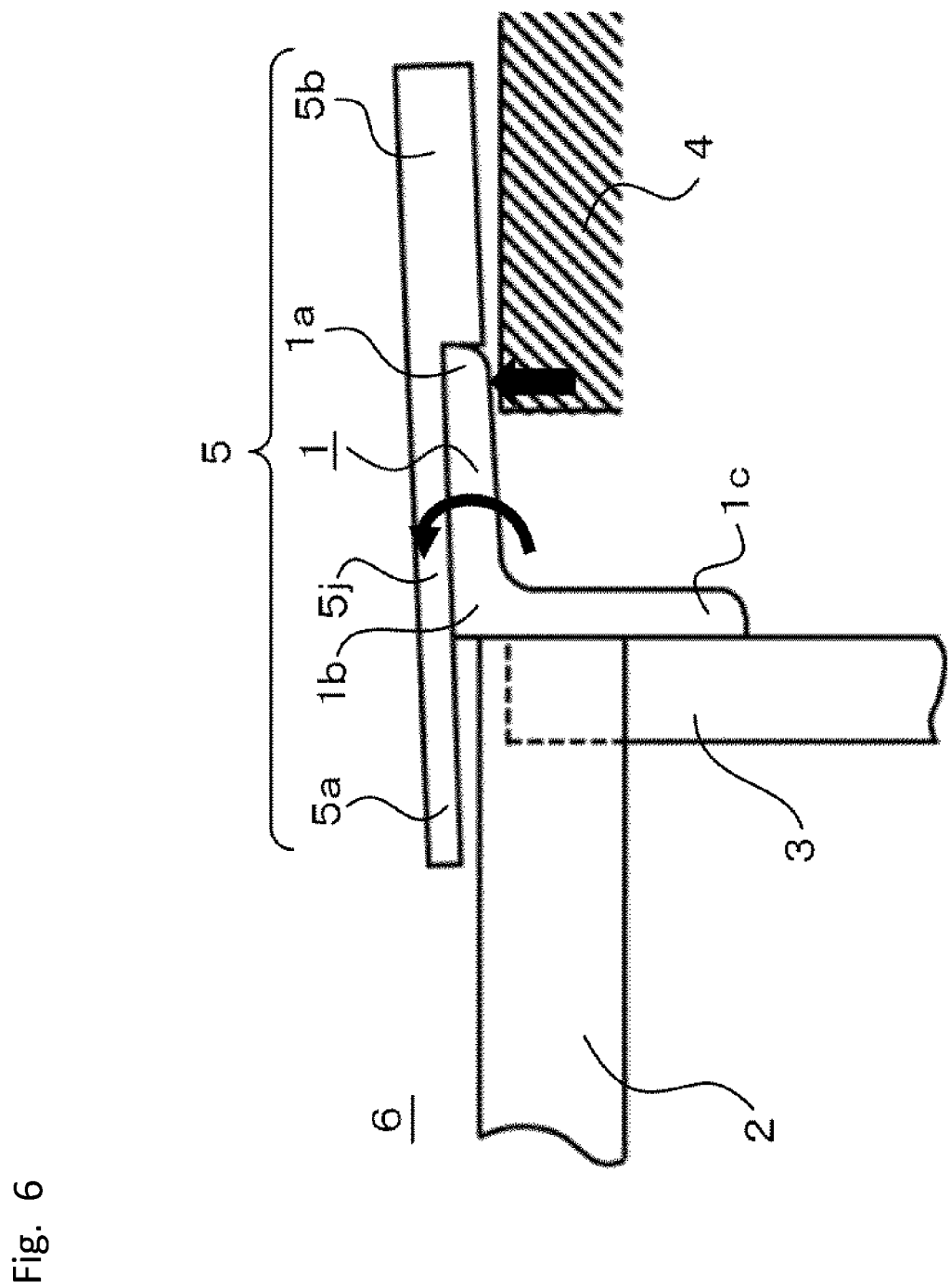
FIG. 6 is a cross-sectional view of the support reinforcement part attached to the support angle according to Embodiment 1 of the present invention, the support reinforcement part being in a situation when an earthquake occurs that has a shake amplitude expected in the pre-revision law.

FIG. 6 is a cross-sectional view of the support reinforcement part 5 attached to the support angle of the present embodiment, the support reinforcement part being in a situation when an earthquake occurs that has a shake amplitude expected in the pre-revision law. As shown in FIG. 5, the lower face of the building-side extension portion 5b is in contact with the floor face of the building structure 4, and the support angle 1 is in contact with the floor face of the building structure 4. In this situation, the lower face of the support angle 1 receives a support reaction force from the building structure 4. Consequently, the base corner 1b of the support angle 1 deforms due to the moment caused by the support reaction force. As a result, the end 1a of the support angle 1 is displaced perpendicularly upward, thus a portion between the end 1a and the base corner 1b of the support angle 1 inclines from a horizontal level. The support reinforcement part 5 attached to the upper face of the support angle 1 inclines according to the deformation of the support angle 1, and parts of the lower face of the main-frame-side extension portion 5a, which is extended along the upper chord part 2, move closer to the upper face of the upper chord part 2 as the parts are positioned closer to the end of the main-frame-side extension portion.

It is relatively easily possible to obtain, from the magnitudes and positions of the support reaction force acting on the support angle 1 and the support reinforcement part 5, the deformation amounts and stresses generated with respect to the support angle 1 and the support reinforcement part 5, by using a commercially available structural analysis software (such as ANSYS (produced by ANSYS, Inc.) or I-DEAS (produced by Information Services International-Dentsu, Ltd.)). In the present embodiment, in a case where a support reaction force acts on the lower face of the support angle 1, the support reaction force deforms the support angle 1. Under consideration of the hardness of the support angle 1, a gap G is provided between the lower face of the main-frame-side extension portion 5a and the upper face of the upper chord part 2 in a state of no support reaction force so that the lower face of the main-frame-side extension portion 5a of the support reinforcement part 5 will not get contact with the upper face of the upper chord part 2.

Figure 7:
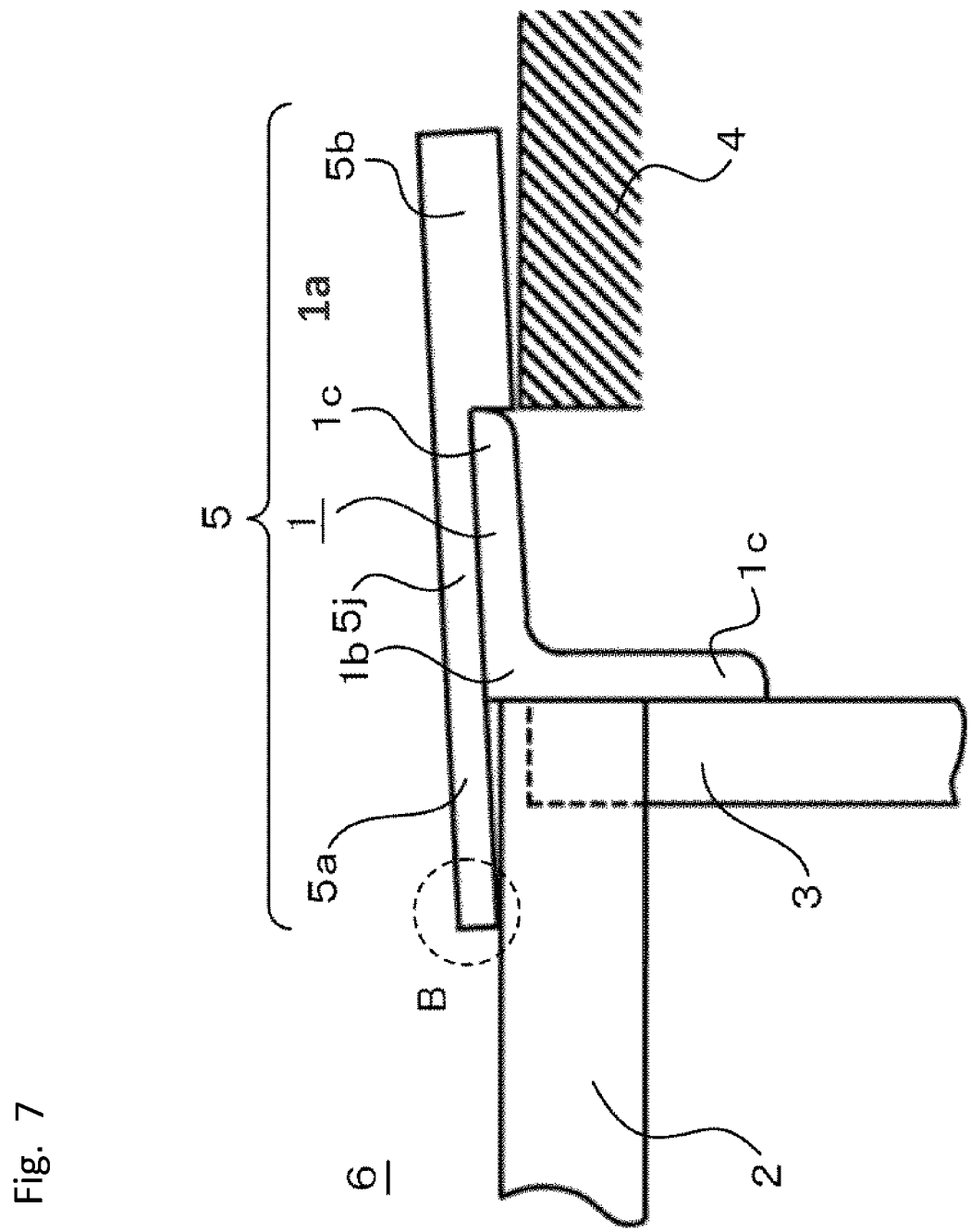
FIG. 7 is a cross-sectional view of the support reinforcement part attached to the support angle according to Embodiment 1 of the present invention, the support reinforcement part being in a situation when an earthquake occurs that has a shake amplitude expected in the post-revision law.

FIG. 7 is a cross-sectional view of the support reinforcement part 5 attached to the support angle 1 according to the present embodiment, the support reinforcement part being in a situation when an earthquake occurs that has a shake amplitude expected in the post-revision law. As shown in FIG. 7, the lower face of the building-side extension portion 5b is in contact with the floor face of the building structure 4 while the support angle 1 is not in contact with the floor face of the building structure 4. Similarly to the case in FIG. 6, the end 1a of the support angle 1 is displaced perpendicularly upward; and according to the displacement, the support reinforcement part 5 inclines so that the lower face end 5k of the building-side extension portion 5b is displaced perpendicularly upward, and the end of the main-frame-side extension portion 5a is displaced perpendicularly downward.

In a case where a support reaction force acts on the lower face of the building-side extension portion 5b, the moment acting around the base corner 1b of the support angle 1 becomes larger than that in the case where the support reaction force acts on the lower face of the support angle 1, whereby the support reaction force produces a larger inclination so that the end 1a of the support angle 1 is more displaced perpendicularly upward. At the same time, the support reinforcement part 5 fixed to the support angle 1 inclines more. Thus, the main-frame-side extension portion 5a of the support reinforcement part 5 is displaced perpendicularly downward more than in the case where the support reaction force acts on the lower face of the support angle 1.

In the present embodiment, in a case where the support reaction force acts on the lower face of the support reinforcement part 5, a deformation produced due to a moment received from the support reaction force brings a perpendicularly downward displacement in the lower face end of the main-frame-side extension portion 5*a* of the support reinforcement part 5, which is extended along the upper chord part 2; the present embodiment is designed so that the amount of the downward displacement is larger than the gap between the lower face of the main-frame-side extension portion 5*a* and the upper face of the upper chord part 2 when the support reaction force does not act. Therefore, in a case where the building structure 4 moves beyond the end of the support angle 1 and thus the support reaction force acts on the lower face of the building-side extension portion 5*b*, the lower face end of the main-frame-side extension portion 5*a* gets contact (as shown in a broken circle B in FIG. 7) with the upper face of the upper chord part 2 of the passenger conveyor.

As shown in FIG. 6, in a case where the building structure 4 is in contact with the lower face of the support angle 1 so that the support reaction force acts on the lower face of the support angle 1, a moment which is determined by the distance between the base corner 1*b* of the support angle 1 and the position where the support reaction force acts and by the support reaction force's magnitude, acts around the base corner 1*b* of the support angle 1. Also, the support angle 1 and the support reinforcement part 5 are fixed to each other by bolting or welding; and through the fixing spot, the moment due to the support reaction force is transmitted also to the support reinforcement part 5.

In FIG. 6, however, the support reinforcement part 5 fixed to the support angle 1 is merely inclined in accordance with the deformation of the support angle 1. Also, the support angle 1 is originally expected to receive the support reaction force on the lower face of the support angle 1; therefore the support angle is designed to have a sufficient strength and rigidity against the support reaction force. Therefore, in the state shown in FIG. 6, the support reinforcement part 5 does not deform due to the moment received by the support angle 1. Also, because the lower face of the main-frame-side extension portion 5*a* does not touch the upper face of the upper chord part 2, the upper face of the upper chord part 2 has no chances to be damaged due to the touching of the main-frame-side extension portion 5*a*.

On the other hand, in a case where, as shown in FIG. 7, the building structure 4 acts on a portion beyond the end 1*a* of the support angle 1, namely only on the lower face of the building-side extension portion 5*b* of the support reinforcement part 5, the support angle 1 deforms more than in the case where, as shown in FIG. 6, the building structure 4 gets contact with the support angle 1 and the support reaction force acts on the lower face of the support angle 1, whereby the lower face end of the main-frame-side extension portion 5*a* gets contact with the upper face of the upper chord part 2. Note that also in a case where the lower face end 5*k* of the building-side extension portion 5*b* is in contact with the floor face end 42 of the building structure 4, the end of the main-frame-side extension portion 5*a* may be capable of getting contact with the upper face of the upper chord part 2.

Figure 8:
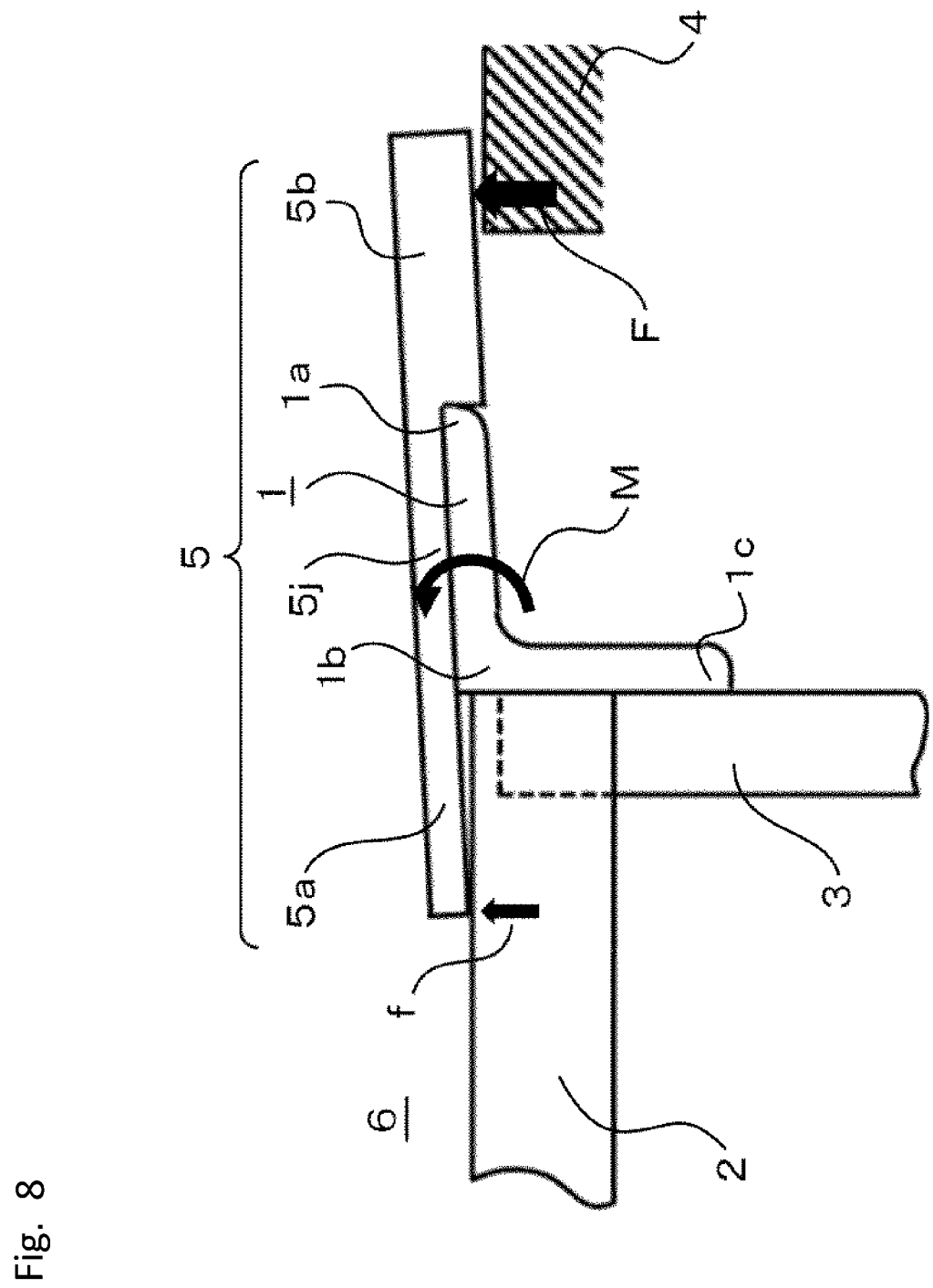
FIG. 8 is a cross-sectional view showing support reaction forces and a moment which act on the support angle and the support reinforcement part of the passenger conveyor according to Embodiment 1 of the present invention, the support reaction forces and the moment being produced when an earthquake occurs that has a shake amplitude expected in the post-revision law.

FIG. 8 shows support reaction forces and a moment which act on the support angle 1 and the support reinforcement part 5 of the passenger conveyor of the present invention, the support reaction forces and the moment being produced when an earthquake occurs that has a shake amplitude expected in the post-revision law. When the support reaction force F acts on the lower face of the building-side extension portion 5*b* of the support reinforcement part 5, the building-side extension portion 5*b* of the support reinforcement part 5 is pushed perpendicularly upward as shown in FIG. 8. The support reinforcement part 5 is fixed to the support angle 1 by bolting or welding; a stress is produced in the building-side extension portion 5*b* by the support reaction force received from the building structure 4, and the stress is transmitted to the support angle 1 via the fixing portion. Around the base corner 1*b* of the support angle 1, a moment M due to the transmitted stress acts in such a direction that the building-side extension portion 5*b* for the support angle 1 lifts vertically upward.

The moment M lifts the building-side extension portion 5*b* and the support angle 1 in the perpendicular direction shown in FIG. 8 to cause deformations therein, whereby the upper face of the upper chord part 2 gets contact with the lower face end of the main-frame-side extension portion 5*a* of the support reinforcement part 5, the main-frame-side extension portion being extended along the upper chord part 2 of the passenger conveyor. At the point where the lower face end of the main-frame-side extension portion 5*a* of the support reinforcement part 5 gets contact with the upper face of the upper chord part 2, a contact force f which serves as the reaction force against the force pressing the upper face of the upper chord part 2 perpendicularly downward in FIG. 8 acts on the lower face end of the main-frame-side extension portion 5*a*.

In a case where the lower face end of the main-frame-side extension portion 5*a* of the support reinforcement part 5 is not in contact with the upper face of the upper chord part 2, the moment M acting around the base corner 1*b* of the support angle 1 can be obtained by the following formula (where the distance between the point of application of the support reaction force and the base corner 1*b* of the support angle 1 is designated as R).

$$M = F \cdot R \qquad \text{[Formula 1]}$$

When the lower face end of the main-frame-side extension portion 5*a* of the support reinforcement part 5 gets contact with the upper face of the upper chord part 2, the main-frame-side extension portion 5*a* of the support reinforcement part 5 receives the contact force f from the upper chord part 2, so that the moment due to the contact force facts around the base corner 1*b* of the support angle 1 so as to cancel the moment produced from the support reaction force F. As a result, the moment M becomes smaller than that in the case where the lower face end of the main-frame-side extension portion 5*a* of the support reinforcement part 5 is not in contact with the upper face of the upper chord part 2.

Figure 9:
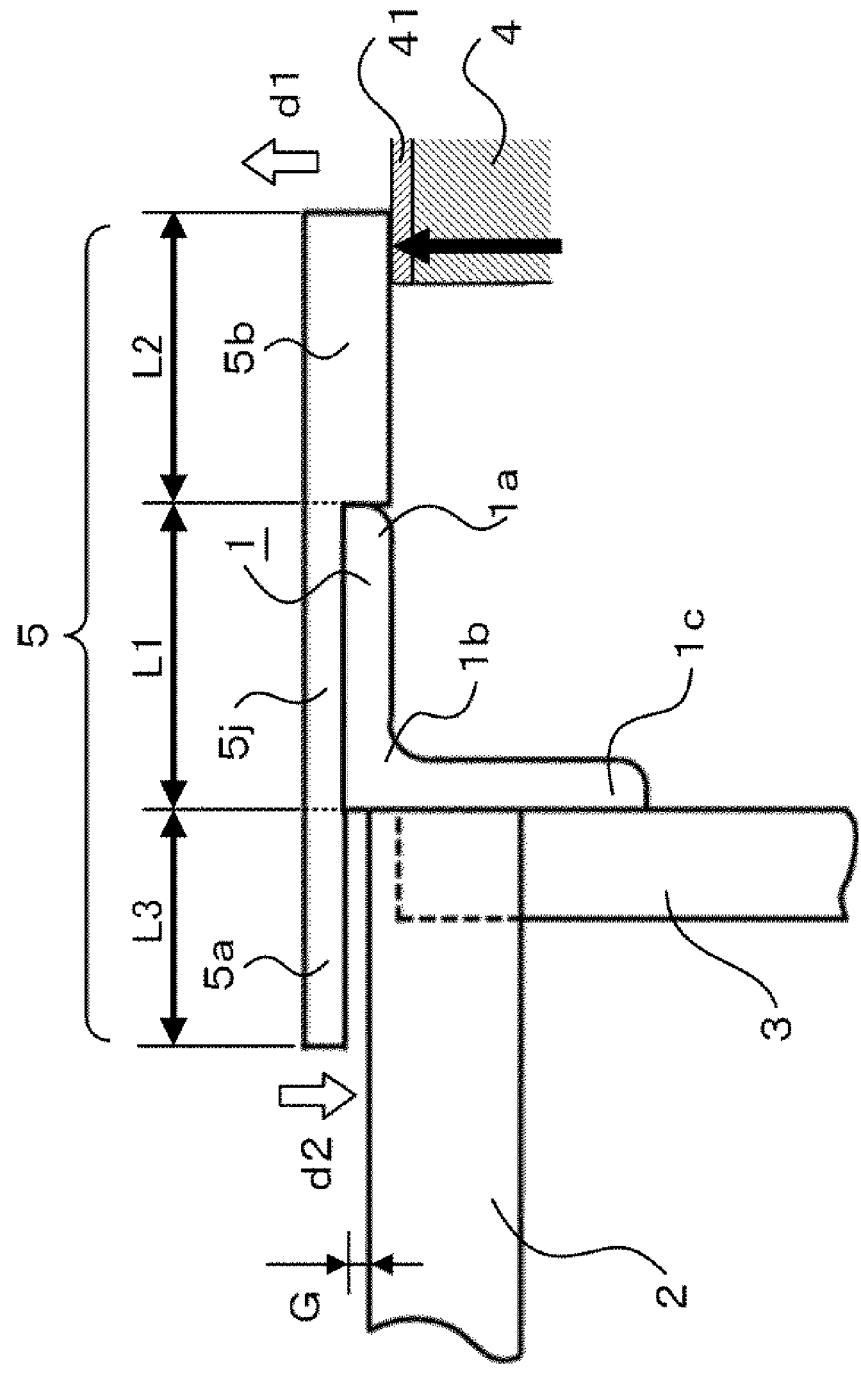
FIG. 9 is a cross-sectional view of another example of the support reinforcement part of the passenger conveyor according to Embodiment 1 of the present invention.
Figure 10:
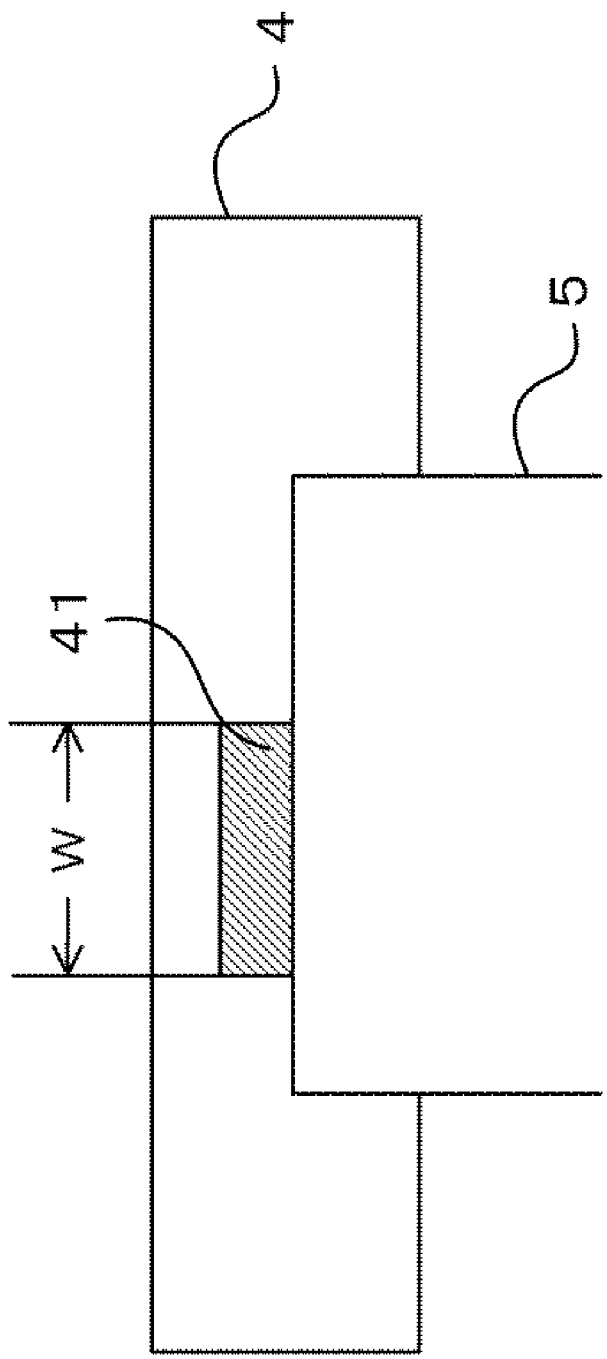
FIG. 10 is a top view including another example of the support reinforcement part of the passenger conveyor according to Embodiment 1 of the present invention and the building structure.

FIG. 9 is a cross-sectional view of another example of the support reinforcement part 5 attached to the support angle 1 of the passenger conveyor of the present invention. FIG. 10 is a top view including the another example of the support reinforcement part 5 of the passenger conveyor according to Embodiment 1 and the building structure 4. Here, the support angle 1 and the support reinforcement part 5 are actually supported by the building structure 4 via a liner 41 as shown in FIG. 9 and FIG. 10.

In FIG. 9, L1 (unit: [mm]) denotes the distance from the base corner 1*b* of the support angle 1 to the end 1*a* thereof. L2 (unit: [mm]) denotes the distance from the end 1*a* of the support angle 1 to the end of the building-side extension portion 5*b*. L3 (unit: [mm]) denotes the distance from the base corner 1*b* of the support angle 1 to the end of the main-frame-side extension portion 5*a*. G (unit: [mm]) denotes the gap between the lower face of the main-frameside extension portion 5a and the upper face of the upper chord part 2. A symbol t (unit: [mm]) denotes a perpendicular thickness of the support angle 1. In FIG. 10, a symbol w (unit: [mm]) denotes the width of the liner 41, i.e. the width-direction-length of the support angle 1 and the building-side extension portion 5b on which the support reaction force acts.

Consideration will be made of a state in which a large scale earthquake shakes the building to cause a support reaction force to act on a foremost point of the building-side extension portion 5b beyond the end of the support angle 1. Assuming that F (unit: [N]) is the support reaction force received by the building-side extension portion 5b from the building structure 4; E (unit: [Pa]) is a longitudinal elastic modulus of a material used for the support angle 1; and I (unit: [mm$^4$]) is the cross-sectional secondary moment of the support angle 1 on which the support reaction force F acts, Formula (2) shown below expresses a displacement amount d1 (unit: [mm]) by which amount a point where the support reaction force acts on the building-side extension portion 5b is displaced in the support reaction force direction.

$$d1 = \frac{F(L1+L2)^3}{3EI} \quad \text{[Formula 2]}$$

The cross-sectional secondary moment indicates an index to resist deformation. The cross-sectional secondary moment is determined according to the cross-sectional shape. Formula (3) shown below expresses the cross-sectional secondary moment I of the support angle 1 on which the support reaction force acts.

$$I = \frac{wt^3}{12} \quad \text{[Formula 3]}$$

Assuming that L3 (unit: [mm]) denotes the length of the main-frame-side extension portion 5a of the support reinforcement part 5, Formula (4) calculates the downward displacement amount d2 (unit: [mm]) of the end of the main-frame-side extension portion 5a.

$$d2 = \frac{L3}{L1+L2}d1 \quad \text{[Formula 4]}$$

That is, according to Formula (2) and Formula (4), d2 can also be calculated by the following Formula (5).

$$d2 = \frac{F(L1+L2)^2 L3}{3EI} \quad \text{[Formula 5]}$$

The longitudinal elastic modulus E of the typical steel (SS400) used for the main frame 6 of the passenger conveyor is 206 [GPa]. A typical L-shaped steel is used for the support angle 1, where L1 generally ranges from 200 mm to 250 mm. Also, the support angle 1 of the passenger conveyor is typically designed on an assumption that a support reaction force F up to about 35 [kN] acts on the support angle. If it is supposed that the value of L2 is in a range of 10 mm to 300 mm, the value is sufficient for a normal passenger conveyor. For example, it is supposed here that w=180 [mm] and t=25 [mm].

On the basis of the values presented above, Formulas (2) and (3) give calculation results as follows: when L1=200 mm, d1=2 to 30 mm; and; when L1=250 mm, d1=4 to 40 mm.

In a case where, focusing on the length L3 of the main-frame-side extension portion 5a of the support reinforcement part 5, the support reinforcement part 5 is formed so that the ratio of (L1+L2):L3 will range from 0.5 to 1, Formula (4) gives, using the above calculation results of d1, the following results.

When L1=200 mm, d2=1 to 30 mm; and When L1=250 mm, d2=2 to 40 mm.

The above calculation results reveal that, in a case where the support reinforcement part 5 is applied to a normal passenger conveyor and where the support reaction force acts only on the lower face end of the building-side extension portion 5b of the support reinforcement part 5, a gap G of 1 mm or less provided between the upper face of the upper chord part 2 and the lower face of the main-frame-side extension portion 5a causes the lower face end of the main-frame-side extension portion 5a to get contact with the upper face of the upper chord part 2. That is, the moment M received around the base corner 1b of the support angle 1 becomes smaller than that in the case where the lower face end of the main-frame-side extension portion 5a of the support reinforcement part 5 is not in contact with the upper face of the upper chord part 2.

The perpendicularly downward displacement amount d2 of the end of the main-frame-side extension portion 5a, calculated by Formulas (2) to (4), is a calculation value in the case where the support reaction force acts only on the lower face end of the building-side extension portion 5b of the support reinforcement part 5. Note, however, it is obvious that those formulas are also applicable to a case in which the support reaction force from the building structure 4 acts on any position on the lower face of either the building-side extension portion 5b or the support angle 1.

As described above, the main-frame-side extension portion 5a of the passenger conveyor according to the present embodiment is not fixed to the upper face of the main frame 6, which thereby brings an advantage to further prevent the main frame 6 from cracking or deforming. Also, in a case where the building-side extension portion 5b is in contact with the building structure 4, and where the support angle 1 is not in contact with the building structure 4, the lower face end of the main-frame-side extension portion 5a of the support reinforcement part 5 is able to touch the upper face of the main frame 6. This brings an advantage to reduce the moment acting around the base corner 1b of the support angle 1 when the building-side extension portion 5b of the support reinforcement part 5 reinforcing the support angle 1 receives the support reaction force from the building structure 4 due to the self-weight of the passenger conveyor.

Also even in the case where only the lower face end 5k of the building-side extension portion 5b is in contact with the floor face end 42 of the building structure 4, the lower face end of the main-frame-side extension portion 5a of the support reinforcement part 5 may be able to touch the upper face of the main frame 6. Also in this case, there is the advantage to reduce the moment acting around the base corner 1b of the support angle 1.

When the building structure 4 is shaken, a stress is generated in the building-side extension portion 5b by the support reaction force acting from the building structure 4. In this case, it suffices that the stress transmitted to the support angle 1 is smaller than the breaking stress of the support angle 1. This brings another advantage to prevent the support angle 1 from being broken.

When the building structure 4 is shaken, a stress is generated in the building-side extension portion 5b by the support reaction force acting from the building structure 4. In this case, it also suffices that the stress transmitted to the support angle 1 is smaller than the yield stress of the support angle 1. In that case, after being once deformed, the support angle 1 does not keep its deformed external shape, giving an advantage in that there is no need to repair or replace the support angle 1. It is relatively easily possible to obtain the breaking stress of the support angle 1 and the yield stress thereof, using the commercially-available structural analysis software tools listed previously.

Also, when the lower face of the main-frame-side extension portion 5a gets in contract with the upper chord part 2 of the main frame 6, it is not necessarily required that the contacting portion on the lower face of the main-frame-side extension portion 5a be the end thereof. It suffices that at least a portion of the lower face of the main-frame-side extension portion 5a is capable of touching the upper face of the upper chord part 2 of the main frame 6.

Embodiment 2

Figure 11:
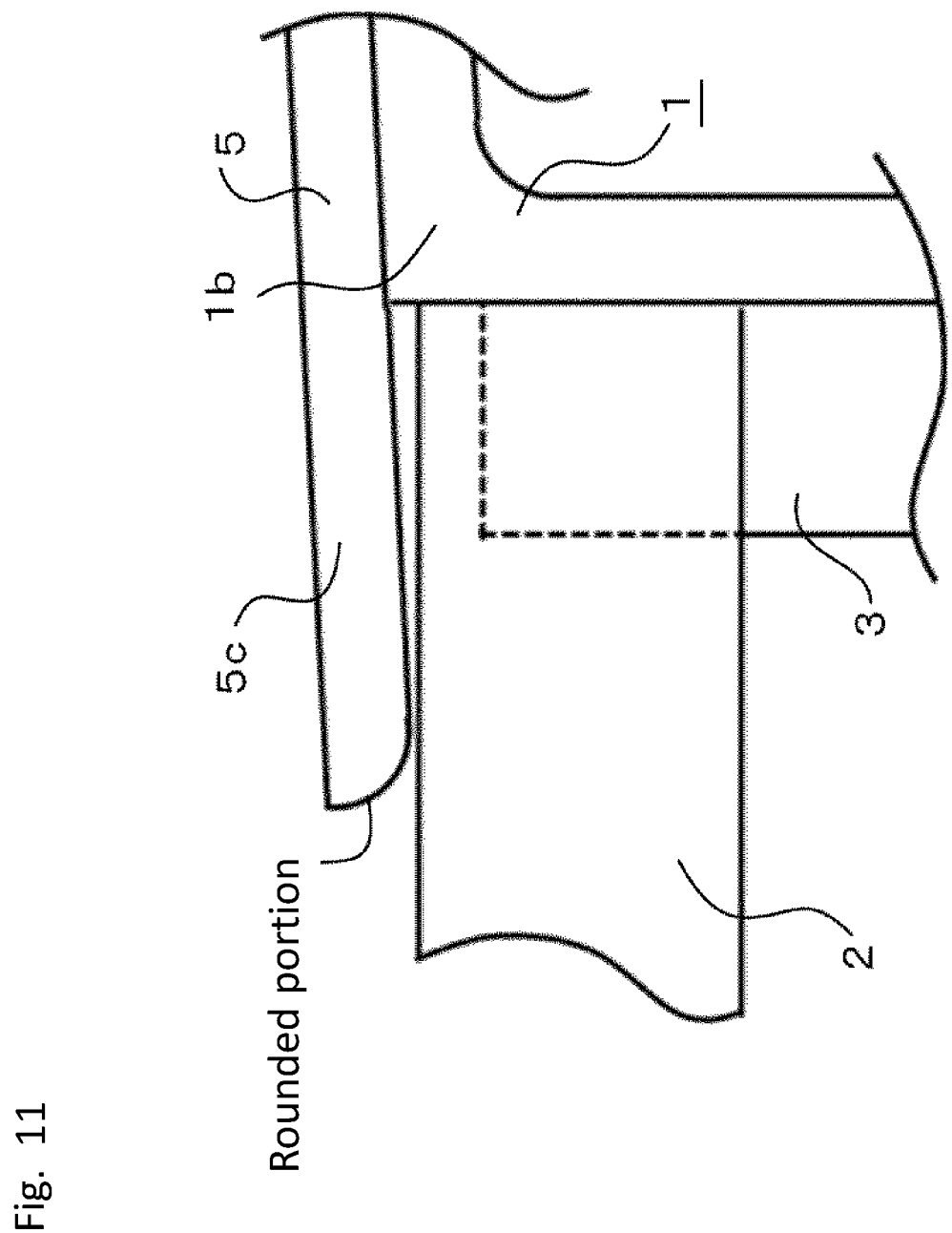
FIG. 11 is a cross-sectional view showing a rounded shape at the end of a main-frame-side extension portion of a passenger conveyor according to Embodiment 2 of the present invention.

Hereinafter, the configuration of a passenger conveyor according to the present embodiment will be described with reference to FIG. 11. FIG. 11 is a cross-sectional view showing a rounded shape at the end of a main-frame-side extension portion 5c of the passenger conveyor of the present embodiment. In FIG. 11, the same numerals as used in FIG. 5 designate the same components. The support reinforcement part 5 according to the present embodiment includes a main-frame-side extension portion 5c in place of the main-frame-side extension portion 5a according to Embodiment 1. The other components of the present embodiment are the same as those in Embodiment 1, so that their description will be omitted.

The lower face end of the main-frame-side extension portion 5c of the support reinforcement part 5 has a convex shape (such as a rounded shape), which is different from a square shape of the lower face end of the main-frame-side extension portion 5a according to Embodiment 1. In a case where the lower face end of the main-frame-side extension portion 5c of the support reinforcement part 5 gets contact with the upper face of the upper chord part 2, the rounded shape gives a larger contact area between the lower face end of the main-frame-side extension portion 5c of the support reinforcement part 5 and the upper face of the upper chord part 2 than that in Embodiment 1.

As described above, it is obvious that the present embodiment has the same advantages as in Embodiment 1; in the present embodiment, in a case where the lower face end of the main-frame-side extension portion 5c of the support reinforcement part 5 gets contact with the upper face of the upper chord part 2, the contact area between the lower face end of the main-frame-side extension portion 5c of the support reinforcement part 5 and the upper face of the upper chord part 2 is larger than that in Embodiment 1, whereby the contact force produced on the contact portion between the lower face end of the main-frame-side extension portion 5c and the upper face of the upper chord part 2 is smaller. This lead to another advantage to reduce damages to be given to the upper chord part 2 from the main-frame-side extension portion 5c.

Embodiment 3

Figure 12:
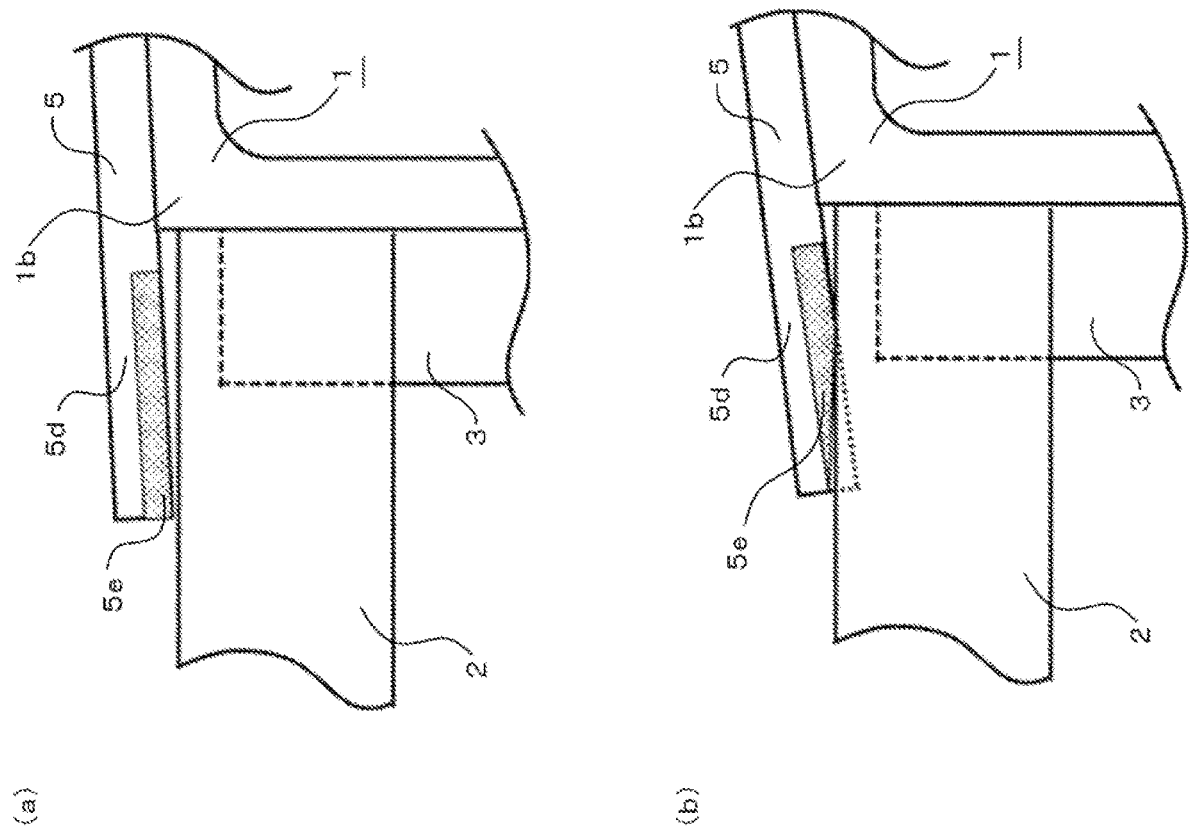
FIG. 12 are each a cross-sectional view of a buffer part provided to the end of a main-frame-side extension portion of a passenger conveyor according to Embodiment 3 of the present invention.

Hereinafter, the configuration of a passenger conveyor according to the present embodiment will be described with reference to FIG. 12. FIG. 12 are each a cross-sectional view showing a buffer part 5e provided to the end of a main-frame-side extension portion 5d of the passenger conveyor of the present embodiment. In FIG. 12, the same numerals as used in FIG. 5 designate the same components. A support reinforcement part 5 according to the present embodiment includes a main-frame-side extension portion 5d in place of the main-frame-side extension portion 5a according to Embodiment 1. The other components of the present embodiment are the same as those Embodiment 1, so that their description will be omitted.

A lower face end of the main-frame-side extension portion 5d of the support reinforcement part 5 is provided with the buffer part 5e. The buffer part 5e is made of a material (for example, a synthetic rubber such as a urethane rubber, a silicone rubber, or an isoprene rubber which is a rubber generally used as an anti-vibration rubber) whose elastic modulus is smaller than that of the main-frame-side extension portion 5a (for example, a steel) according to Embodiment 1. FIG. 12(*a*) shows a state in which the buffer part 5e provided at the lower face end of the main-frame-side extension portion 5d of the support reinforcement part 5 is not in contact with the upper face of the upper chord part 2. FIG. 12(*b*) shows a state in which the buffer part 5e provided at the lower face end of the main-frame-side extension portion 5d of the support reinforcement part 5 is in contact with the upper face of the upper chord part 2.

FIG. 12(*b*) shows that the buffer part 5e provided at the lower face end of the main-frame-side extension portion 5d of the support reinforcement part 5 gets contact with the upper face of the upper chord part 2, whereby the buffer part 5e is deformed. The deformation in the case where the lower face end of the main-frame-side extension portion 5d of the support reinforcement part 5 gets contact with the upper face of the upper chord part 2, makes a contact area between the lower face end of the main-frame-side extension portion 5d of the support reinforcement part 5 and the upper face of the upper chord part 2, larger than contact area therebetween in Embodiment 1.

As described above, it is obvious that the present embodiment has the same advantages as in Embodiment 1; in the present embodiment, in a case where the lower face end of the main-frame-side extension portion 5d of the support reinforcement part 5 gets contact with the upper face of the upper chord part 2, the resultant deformation in the buffer part 5e makes the contact area between the lower face end of the main-frame-side extension portion 5d of the support reinforcement part 5 and the upper face of the upper chord part 2 larger than that in Embodiment 1, thereby resulting a smaller contact force produced at the contact portion between the lower face end of the main-frame-side extension portion 5d and the upper face of the upper chord part 2. This leads, similarly to Embodiment 2, to another advantage to reduce damages to be given to the upper chord part 2 from the main-frame-side extension portion 5d.

In the present embodiment, the buffer part 5e is provided to the lower face end of the main-frame-side extension portion 5d of the support reinforcement part 5. However, instead of to the lower face end of the main-frame-side extension portion 5d, the buffer part 5e may be provided to a portion of the upper face of the upper chord part 2 with which the lower face end of the main-frame-side extension portion 5d gets contact. This configuration similarly leads to the advantage to reduce damages to be given to the upper chord part 2 from the main-frame-side extension portion 5d. It is also obvious that the same advantages are obtained even in a case where buffer parts 5e are provided both to the lower face end of the main-frame-side extension portion 5d and to a portion of the upper face of the upper chord part 2 with which the lower face end of the main-frame-side extension portion 5d gets contact.

Embodiment 4

Figure 13:
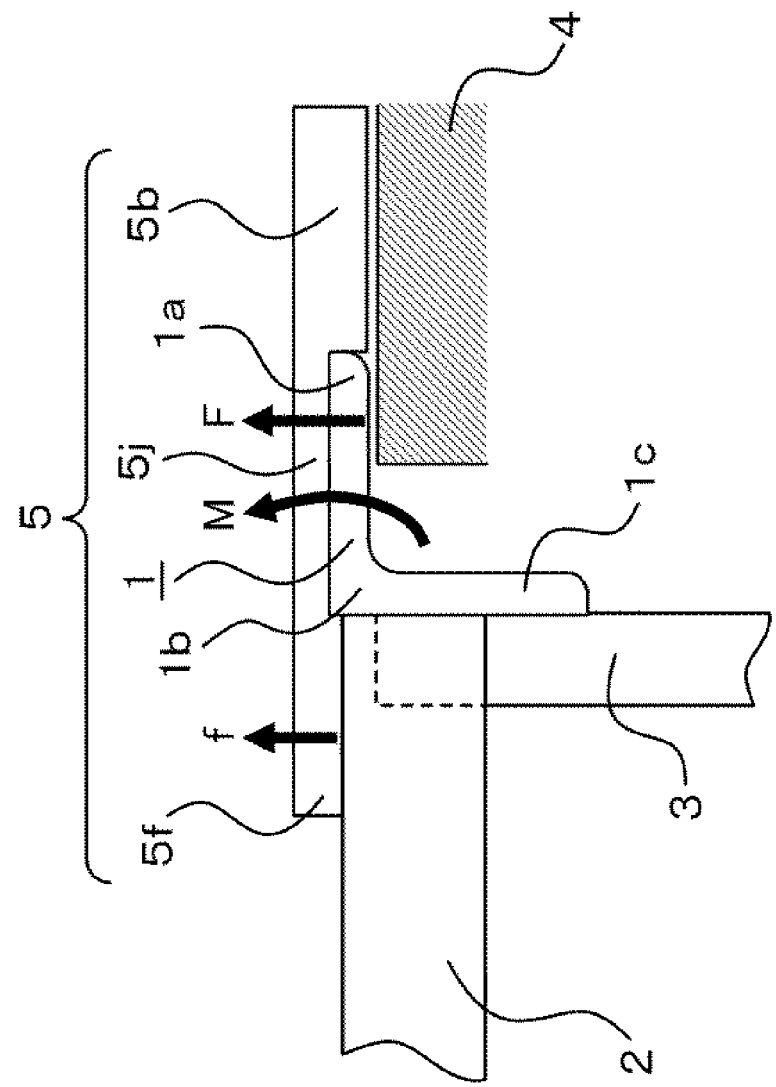
FIG. 13 is a cross-sectional view of a support reinforcement part attached to a support angle of a passenger conveyor according to Embodiment 4 of the present invention.

Hereinafter, the configuration of a passenger conveyor according to the present embodiment will be described with reference to FIG. 13. FIG. 13 is a cross-sectional view of a support reinforcement part 5 attached to the support angle 1 of the passenger conveyor of the present embodiment. In FIG. 13, the same numerals as used in FIG. 5 designate the same components. A support reinforcement part 5 according to the present embodiment includes a main-frame-side extension portion 5f in place of the main-frame-side extension portion 5a according to Embodiment 1. The other components of the present embodiment are the same as those in Embodiment 1, so that their description will be omitted.

The lower face of the main-frame-side extension portion 5f of the support reinforcement part 5 is in contact with the upper chord part 2 when the support reinforcement part 5 is attached to the support angle 1 of the passenger conveyor. Similarly to Embodiment 1, the main-frame-side extension portion 5f is not fixed to the upper chord part 2 by bolting, welding, or the like. Also in FIG. 13, a support reaction force F, a moment M, and a contact force f are defined similarly to those in FIG. 8 of Embodiment 1. Here, the lower face of the main-frame-side extension portion 5f of the support reinforcement part 5 is not fixed to the upper face of the upper chord part 2 of the passenger conveyor by bolting, welding, or the like. Therefore, even when the support reaction force F acts to deform the support angle 1 and the support reinforcement part 5, there is no force that acts between the main-frame-side extension portion 5f of the support reinforcement part 5 and the upper chord part 2 of the passenger conveyor in a direction other than that of the contact force f, that is to say, there is no force which is exemplified in Patent Document 1 and acts orthogonally to the contact force f.

As described above, similarly to Embodiment 1, the main-frame-side extension portion 5f of the present embodiment is not fixed to the upper face of the main frame 6, which thereby brings an advantage to further prevent the main frame 6 from cracking or deforming. In a case where the building-side extension portion 5b is in contact with the building structure 4, and where the support angle is not in contact with the building structure 4, the lower face end of the main-frame-side extension portion 5f of the support reinforcement part 5 is in contact with the upper face of the upper chord part 2 of the main frame 6. Therefore, this embodiment also has an advantage that, when the building-side extension portion 5b of the support reinforcement part 5 reinforcing the support angle 1 receives the support reaction force from the building structure 4 caused by the self-weight of the passenger conveyor, the moment acting around the base corner 1b of the support angle 1 is reduced.

In addition, it is desirable that, when the support reinforcement part 5 is attached to the support angle 1, the lower face of the main-frame-side extension portion 5f is in surface-to-surface contact with the upper face of the upper chord part 2 as shown in FIG. 13. In comparison to Embodiment 1, a larger contact area is provided between the lower face end of the main-frame-side extension portion 5f of the support reinforcement part 5 and the upper face of the upper chord part 2, which thereby reduces the contact force acting on the contact portion between the lower face end of the main-frame-side extension portion 5f and the upper face of the upper chord part 2. Similarly to Embodiments 2 and 3, this configuration leads to an advantage to reduce damages to be given to the upper chord part 2 from the main-frame-side extension portion 5f.

Embodiment 5

Figure 14:
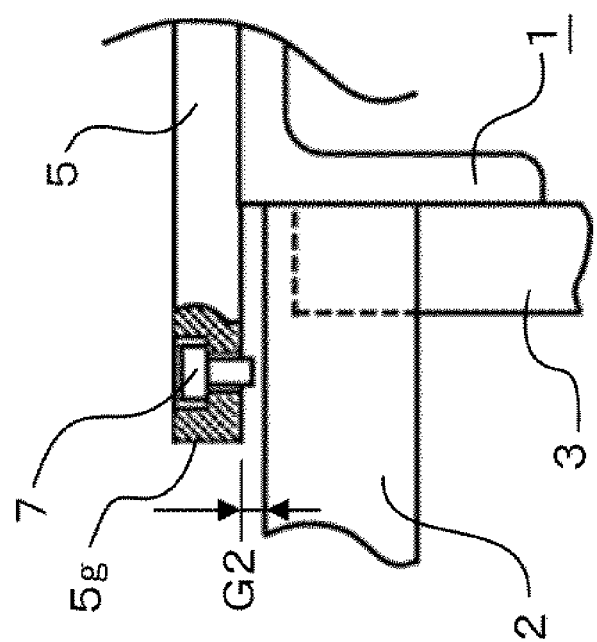
FIG. 14 is a cross-sectional view of a gap adjustment part provided to the end of a main-frame-side extension portion of a passenger conveyor according to Embodiment 5 of the present invention.

Hereinafter, the configuration of a passenger conveyor according to the present embodiment will be described with reference to FIG. 14. FIG. 14 is a cross-sectional view of a gap adjustment part 7 provided to the end of the main-frame-side extension portion 5a of the passenger conveyor according to the present embodiment. In FIG. 14, the same numerals as used in FIG. 5 designate the same components. The support reinforcement part 5 according to the present embodiment includes a main-frame-side extension portion 5g in place of the main-frame-side extension portion 5a according to Embodiment 1. The other components of the present embodiment are the same as those in Embodiment 1, so that their description will be omitted.

A gap G2 is provided between the lower face of the main-frame-side extension portion 5g and the upper face of the upper chord part 2 of the main frame 6. When the passenger conveyor is installed in the building structure 4, the gap G2 keeps the lower face of the main-frame-side extension portion 5g of the support reinforcement part 5 from getting contact with the upper face of the upper chord part 2 even when the lower face end of the building-side extension portion 5b receives the support reaction force.

The main-frame-side extension portion 5g of the support reinforcement part 5 is provided with a gap adjustment part 7 to adjust the gap G2 between the main-frame-side extension portion 5g and the upper face of the upper chord part 2. As shown in FIG. 14, the gap adjustment part 7 may be configured with a bolt. The gap G2 between the lower face of the main-frame-side extension portion 5g of the support reinforcement part 5 and the upper face of the upper chord part 2 is adjusted by the screwing amount of the bolt serving as a gap adjustment part 7.

As described above, it is obvious that the present embodiment also has the same advantages as in Embodiment 1. Furthermore, in the main-frame-side extension portion 5g of the support reinforcement part 5, the gap adjustment part 7 is provide to adjust the gap G2 between the lower face of the main-frame-side extension portion 5g and the upper face of the upper chord part 2. The level difference between the upper and lower floors to install the passenger conveyor varies delicately depending on the installation conditions, whereby the expected support reaction force varies. The present embodiment has an advantage to be capable of finely adjusting the gap during attaching the support reinforcement part 5 to the support angle 1 to cope with the delicately varied conditions.

It is obvious that the present invention according to Embodiments 1 to 5 is applicable not only to an escalator but also to a moving walkway.

The scope of the present invention is not limited to Embodiments 1 to 5. Within the scope of the present invention, it is possible to freely combine the embodiments, or suitably modify or omit parts of the embodiments.

DESCRIPTION OF SYMBOLS

1: support angle
1a: end of support angle

1b: base corner of support angle
1c: support angle mounting portion
2: upper chord part
12: lower chord part
3: upright part
13: upright part
4: building structure
41: liner
42: floor face end of building structure
5: support reinforcement part
5a: main-frame-side extension portion
5b: building-side extension portion
5c: main-frame-side extension portion
5d: main-frame-side extension portion
5e: buffer part
5f: main-frame-side extension portion
5g: main-frame-side extension portion
5h: main-frame-side extension portion
5j: connection portion
5k: lower face end of building-side extension portion
6: main frame
7: gap adjustment part
8: moving handrail
9: balustrade
51: extension part

The invention claimed is:

1. A passenger conveyor comprising:
a main frame;
a support angle which is provided at an end in a longitudinal direction of the main frame and which is to be disposed on a building structure;
a support reinforcement part comprising
a connection portion which is fixed to the support angle,
a building-side extension portion which is extended from the connection portion along a floor face of the building structure, and
a main-frame-side extension portion which is extended from the connection portion along an upper face of the main frame,
wherein the main-frame-side extension portion is not fixed to the upper face of the main frame, and
wherein in a case where the building-side extension portion of the support reinforcement part is in contact with the building structure, and the support angle is not in contact with the building structure, at least one portion of the main-frame-side extension portion is able to touch the upper face of the main frame.

2. The passenger conveyor according to claim 1, wherein in a case where only an end of a lower face of the building-side extension portion of the support reinforcement part is in contact with an end of a floor of the building structure, at least one portion of the main-frame-side extension portion is able to touch the upper face of the main frame.

3. The passenger conveyor according to claim 1, wherein, while the building structure is shaken, a stress which is to be generated by a support reaction force received by the building-side extension portion from the building structure and which is to be transmitted to the support angle, is smaller than a breaking stress of the support angle.

4. The passenger conveyor according to claim 3, wherein the stress is smaller than a yield stress of the support angle.

5. The passenger conveyor according to claim 1, wherein when the support angle is in contact with the building structure, the main-frame-side extension portion of the support reinforcement part is not in contact with the upper face of the main frame.

6. The passenger conveyor according to claim 1, wherein when the support angle is in contact with the building structure, at least one portion of the main-frame-side extension portion of the support reinforcement part is in contact with the upper face of the main frame.

7. The passenger conveyor according to claim 1, wherein the main-frame-side extension portion includes a gap adjustment part to adjust a gap between the main-frame-side extension portion and the upper face of the main frame.

8. The passenger conveyor according to claim 1, wherein an end of a lower face of the main-frame-side extension portion is in a convex rounded shape.

9. The passenger conveyor according to claim 1, wherein the main-frame-side extension portion includes, at an end of its lower face, a buffer part whose elastic modulus is smaller than that of the main-frame-side extension portion.

10. The passenger conveyor according to claim 1, wherein the main frame includes, at a portion thereof with which an end of a lower face of the main-frame-side extension portion is to get contact, a buffer part whose elastic modulus is smaller than that of the main-frame-side extension portion.

11. A passenger conveyor comprising:
a main frame;
a support angle which is provided at an end in a longitudinal direction of the main frame and which is to be disposed on a building structure;
a support reinforcement part comprising
a connection portion which is fixed to the support angle,
a building-side extension portion which is extended from the connection portion along a floor face of the building structure, and
a main-frame-side extension portion which is extended from the connection portion along an upper face of the main frame,
wherein the main-frame-side extension portion is not fixed to the upper face of the main frame, and
wherein when
a support reaction force received by the building-side extension portion from the building structure is denoted by F [N];
a cross-sectional secondary moment of the support angle on which the support reaction force acts is denoted by I [mm$^4$];
a distance from a base corner of the support angle to an end thereof is denoted by L1 [mm];
a length from the end of the support angle to an end of the building-side extension portion is denoted by L2 [mm];
a length from the base corner of the support angle to an end of the main-frame-side extension portion is denoted by L3 [mm]; and
a longitudinal elastic modulus of the support angle is denoted by E [Pa], a gap between the main-frame-side extension portion and the upper face of the main frame is equal to or less than d2 [mm] which is calculated by a formula of $$d2 = \frac{F(L1+L2)^2 L3}{3EI}.$$

12. A passenger conveyor comprising:
a main frame;
a support angle which is provided at an end in a longitudinal direction of the main frame and which is to be disposed on a building structure;
a support reinforcement part comprising
  a connection portion which is fixed to the support angle,
  a building-side extension portion which is extended from the connection portion along a floor face of the building structure, and
  a main-frame-side extension portion which is extended from the connection portion along an upper face of the main frame,
wherein the main-frame-side extension portion is not fixed to the upper face of the main frame, and
wherein
  a length from an end of the support angle to an end of the building-side extension portion is in a range of 10 mm to 300 mm;
  a length from a base corner of the support angle to an end of the main-frame-side extension portion is in a range of 105 mm to 550 mm; and
  a gap between the main-frame-side extension portion and the upper face of the main frame is equal to or less than 1 mm.

* * * * *